United States Patent [19]
Gebert

[11] 4,049,073
[45] Sept. 20, 1977

[54] CIRCUIT BREAKER

[76] Inventor: Meril D. Gebert, 560 - 30th Ave. Sp. 37, Santa Cruz, Calif. 95060

[21] Appl. No.: 673,723

[22] Filed: Apr. 5, 1976

[51] Int. Cl.² .......................................... B60K 28/00
[52] U.S. Cl. ........................... 180/103 A; 200/61.45 R
[58] Field of Search ................ 180/82 R, 103 A; 200/61.45 R

[56] References Cited

U.S. PATENT DOCUMENTS

| | | | |
|---|---|---|---|
| 1,591,149 | 7/1926 | Waltamath | 200/61.45 R |
| 1,901,554 | 3/1933 | De Wilde | 180/103 A |
| 2,206,067 | 7/1940 | Waltamath | 180/103 A X |
| 2,778,896 | 1/1957 | Tollefsen | 200/61.45 R |
| 2,816,188 | 12/1957 | Stout | 200/61.45 R |
| 3,243,537 | 3/1966 | Jezek | 180/103 A X |
| 3,466,409 | 9/1969 | Pernet | 200/61.45 R |
| 3,484,571 | 12/1969 | Williams | 200/61.45 R X |
| 3,797,603 | 3/1974 | Loomba | 180/82 R |
| 3,836,738 | 9/1974 | Baland | 200/61.45 R |

Primary Examiner—Philip Goodman
Assistant Examiner—Terrance L. Siemens
Attorney, Agent, or Firm—Paul B. Fihe

[57] ABSTRACT

An automatic circuit breaker for a vehicle, such as an automobile, truck, boat, airplane, or the like, having an internal combustion engine with at least one associated electrical power circuit which includes a switch in such power circuit together with a toggle joint operative to open and close such circuit and a pendulum-like weight adapted to move upon vehicle impact to actuate said toggle joint to open the switch, thus to avoid electrical ignition of the gaseous fuel subsequent to a gross impact of the vehicle. The same impact can be arranged to actuate the toggle joint to either open to close other circuits.

6 Claims, 3 Drawing Figures

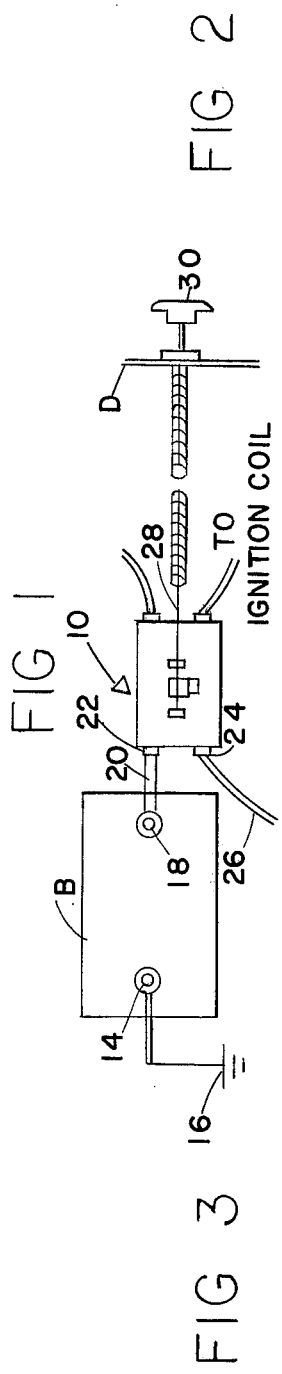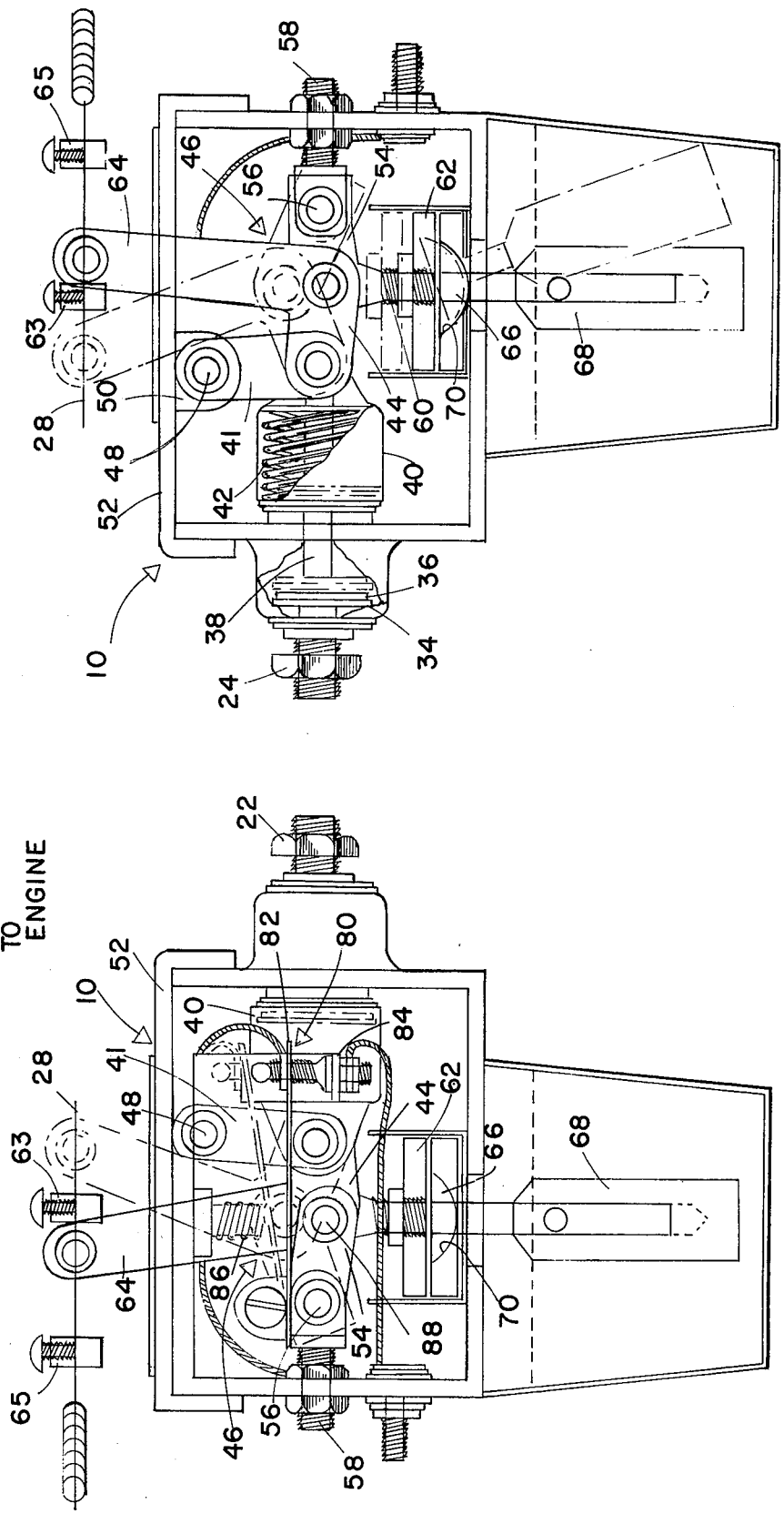

CIRCUIT BREAKER

FIELD OF THE INVENTION

The present invention relates generally to electrical circuit breakers and more particularly to an electrical circuit breaker in the form of the unit which can be installed on a vehicle such as an automobile, truck, boat, or airplane to automatically open an electrical circuit to the internal combustion engine for such vehicle upon impact, thus to avoid inadvertent explosion or fire.

BACKGROUND OF THE INVENTION

It is well known that in the case of collision or other accident, fuel lines, carburetors, or other instrumentalities of an internal combustion engine on an automobile are broken and the flammable gasoline or other fuel is ignited so that an explosion or fire occurs. In some cases, although damage to the automobile or injury to the occupants is initially relatively minor, the resultant explosion or fire has in some instances, caused severe injury or even death.

As a consequence, certain devices have been designed to interrupt the electrical power circuit to the engine of the vehicle in the case of a gross impact such as occurs during a collision or other misadventure but such previous designs have been expensive, complex, and not always operative so that their use has been practically unacceptable.

SUMMARY OF THE PRESENT INVENTION

Accordingly, it is the general objective of the present invention to provide a simple electrical circuit breaker in the form of a unit that can be quickly and easily installed in the electrical power circuit or circuits of an existing vehicle, be it an automobile, truck, boat, or airplane that will function in an automatic and substantially foolproof manner to insure interruption of the flow of electrical energy in the event of a collision or other accident.

Briefly, the electrical circuit breaker is in the form of a small unit which can be readily installed preferably immediately adjacent the battery which serves as the ultimate electrical power source in a vehicle which utilizes an internal combustion engine as a prime mover. The installed unit includes a simple switch which is connected to a toggle joint arranged so that such toggle joint, when moved beyond dead center to either of two positions, will effect opening or closure of such switch and will maintain such switch in its open or closed positions resiliently in response to the action of an associated spring mechanism.

In order to open the switch in the event of a collision or other impact, the present invention contemplates utilization of means including an associated element which will be moved upon such impact so as to automatically effect motion of such toggle joint from its switch-closed to its switch-open position and preferably such means is in the form of a pendulum-like weight which is movable in any direction in response to an impact force whether it be from the front, rear or side of the vehicle.

The mentioned switch can be connected in the main electrical circuit from the battery, and if desired, an additional switch in the direct ignition circuit can also be connected to the toggle joint so as to open upon an impact, as described.

In addition, actuation of the toggle joint can be arranged to close a circuit such as a light circuit resultant from the same impact.

Preferably, there is also a manual control accessible to the driver of the automobile or other vehicle which can reset the switch or switches to closed positions when required and it will be observed that such manual mechanism can be utilized also to open or close the switches when the vehicle is not being utilized to provide deterrent to vehicle theft.

BRIEF DESCRIPTION OF THE DRAWINGS

The stated objective of the invention and the manner in which it is achieved, as summarized hereinabove, will be more readily understood by reference to the following detailed description of an exemplary embodiment of the invention shown in the accompanying drawing wherein:

FIG. 1 is a somewhat diagramatic top plan view showing application of an automatic electrical circuit breaker to a vehicle in accordance with the present invention, FIG. 2 is an enlarged front side view of the automatic circuit breaker unit with portions broken away to show interior details of construction and operation, and FIG. 3 is a rear side view of the circuit breaker, showing additional structural and operational details.

DETAILED DESCRIPTION OF THE EXEMPLARY EMBODIMENT OF THE INVENTION

As shown best in FIG. 1, the automatic electrical circuit breaker of the present invention, generally indicated by the numeral 10, is arranged to be mounted adjacent the side of a battery B which constitutes the most conventional ultimate electrical power source found in association with internal combustion engines, whether they be utilized in automobiles, trucks, boats, or airplanes and it is to be understood that the utilization of the term "vehicle" in following specification and in the claims is to be construed as covering passenger-occupied vehicles of various types.

One terminal 14 of the battery B is grounded as indicated at 16 and the other terminal 18 is connected by a rigid conductive connector 20 to a terminal 22 on the side of circuit breaker 10. As will be described hereinafter in detail, switch means in the breaker unit 10 serves to make or break the circuit which then extends from an output terminal 24 to the engine with a conventional connection indicated at 26. In addition, a manual control cable 28 extends from the described electrical circuit breaker 10 to the dashboard D of an automobile, boat, or other vehicle with a manual control knob 30 positioned at its extremity so that the operator of the vehicle can have manual control of the circuit breaker mechanism, again, as will be described in detail hereinafter.

With additional reference to FIG. 2, the mentioned switch means includes a pair of contacts one of which is shown at 34 that are electrically connected to the inlet and outlet electrical terminals 22, 24. A conductor 36 adapted to engage both contacts 34 is mounted at the end of a rod 38 joined to a movable switch housing member 40 which is urged to the right to switch-open position, as shown in FIG. 2 by a coil spring 42. The movable housing member 40 is, in turn, pivotally connected to the end of one link 44 of a toggle joint 46 which link end is also pivotally secured to one end of a supporting link 41 pivotally carried on a stationary pivot pin 48 mounted in a suitable bracket 50 at the top of a generally box-like housing 52 for the entire circuit breaker mechanism. The opposite end of the toggle link 44 is pivotally connected to one extremity of a second toggle link 54 whose remote end is in turn connected to a fixed pivot pin 56 mounted on an adjustment bolt 58 at the opposite side of the housing 52. The described spring 42 normally urges the links 44, 54 of the toggle joint 46 together so that they will be resiliently held in nonaligned dispositions above or below "dead center" and adjustment of the bolt 58 will vary the resilient holding force.

The position below "dead center", as shown in full lines in FIG. 2, is restricted by engagement of a rod 60 which depends from the center of the toggle joint 46 and mounts at its lower extremity, a plastic plate 62 adapted for engagement with vehicle impact means to be described hereinafter. When in such position, as shown in full lines, the toggle joint 46 will hold the switch resiliently in its closed position. On the other hand, if the toggle joint 46 is moved upwardly to the phantom line disposition shown in the figure, the action of the spring 42 will effect considerable displacement of the toggle joint upwardly and allow the switch to open as shown also in phantom lines.

As previously mentioned, the control cable 28 is arranged to move the switch between its open and closed dispositions and as illustrated in FIG. 2, when the control knob 30 is pulled, a stop 63 on the cable engages a crank arm 64 that is joined to the central portion of the toggle joint 46 so as to move to the full-time disposition whereat the switch is closed. On the other hand, if the control knob 30 is pushed inwardly, another stop 65 on the cable 28 will effect motion of the toggle joint 46 to return the switch to its open disposition, as shown in phantom lines.

When the switch is closed, the described plate 62 at the end of the depending rod 60 connected to the central portion of the toggle line 46 is arranged to closely overlie the upper substantially flat suface of a hemispherical support 66 for a dependent pendulum 68, which is freely pivotable in any direction therebelow. The hemispherical support 66 is carried in a corresponding hemispherical socket 70 in the bottom of the housing, and if any substantial impact to the vehicle occurs, the inertia of the pendulum 68 will cause the entire structure to swing towards the phantom line disposition in FIG. 2, thus to engage the plate 62 connected to the toggle joint 46 to move the same upwardly from its switch-closed position, as shown in full lines, to its switch-open position, thus automatically breaking the electrical circuit. It is to be particularly observed that the direction of impact is irrelevant, an impact from the side, front, or rear of the vehicle will cause such action to occur.

In addition to opening the main electrical circuit from the battery B, the described mechanism is also able to simultaneously open a second switch 80 in the ignition circuit. As best shown in FIG. 3, such ignition switch 80 includes a pivoted contact 82 adapted to normally engage a fixed contact 84 under action of a coil spring 86 but when the described toggle joint 46 moves upwardly to its phantom line disposition, a pin 88 extending laterally from the toggle joint 46 engages the pivoted contact 82 to move the ignition switch to an open position.

As an obvious alternative, the toggle joint motion resultant from impact can similarly be arranged to close a switch in yet another circuit such as a circuit for lights on the vehicle.

It will be observed that modifications in the pendulum-like actuating structure as described can be envisioned without departing from the spirit of the invention and as a consequence, the foregoing description of one embodiment is to be considered as purely exemplary an not in a limiting sense and the actual scope of the invention is to be indicated only by reference to the appended claims.

What is claimed is:

1. An automatic circuit breaker for a vehicle having an internal combustion engine having an associated electrical power circuit which comprises
   a switch in said power circuit,
   a toggle joint operative to open or close said switch, and
   means responsive to vehicle impact to move said toggle joint between switch-closed and switch-opened positions,
   said toggle moving means including a weight supported by rigid members for universal pivotal motion to contact and move said toggle joint.

2. An automatic circuit breaker according to claim 1 wherein
   said weight is supported as a universally-pivotal pendulum.

3. An automatic circuit breaker according to claim 1 which comprises
   spring means operable to resiliently hold said toggle joint in its switch-opened or switch-closed positions.

4. An automatic circuit breaker according to claim 3 which comprises
   means for adjusting the force of said spring means.

5. An automatic circuit breader according to claim 1 which comprises
   additional manually-operated means for moving said toggle joint between switch-opened and switch-closed positions.

6. An automatic circuit breaker according to claim 5 wherein
   said manually-operated means includes a control cable and spaced stops thereon for opening or closing said switch in response to manual pulling or pushing of said cable.

* * * * *